(12) United States Patent
Osterhoff et al.

(10) Patent No.: US 10,261,758 B2
(45) Date of Patent: Apr. 16, 2019

(54) PATTERN RECOGNITION OF SOFTWARE PROGRAM CODE IN AN INTEGRATED SOFTWARE DEVELOPMENT ENVIRONMENT

(71) Applicant: SAP SE, Walldorf (DE)

(72) Inventors: Johannes Osterhoff, Heidelberg (DE); Hans-Peter Schaerges, Mannheim (DE)

(73) Assignee: SAP SE, Walldorf (DE)

( * ) Notice: Subject to any disclaimer, the term of this patent is extended or adjusted under 35 U.S.C. 154(b) by 344 days.

(21) Appl. No.: 14/706,754

(22) Filed: May 7, 2015

(65) Prior Publication Data

US 2016/0328215 A1  Nov. 10, 2016

(51) Int. Cl.
  *G06F 3/00* (2006.01)
  *G06F 3/041* (2006.01)
  *G06F 8/34* (2018.01)
  *G06F 8/70* (2018.01)
  *G06F 8/75* (2018.01)
  *G06F 11/32* (2006.01)

(52) U.S. Cl.
  CPC .................. *G06F 8/34* (2013.01); *G06F 8/70* (2013.01); *G06F 8/75* (2013.01); *G06F 11/323* (2013.01)

(58) Field of Classification Search
  CPC ........................................................ G06F 8/34
  See application file for complete search history.

(56) References Cited

U.S. PATENT DOCUMENTS

| | | | | |
|---|---|---|---|---|
| 6,158,903 A * | 12/2000 | Schaeffer | ............ | H04L 67/1095 709/204 |
| 2001/0028369 A1 * | 10/2001 | Gallo | .................. | G06F 3/04815 715/848 |
| 2003/0034998 A1 * | 2/2003 | Kodosky | ............ | G05B 19/0426 715/736 |
| 2003/0105620 A1 * | 6/2003 | Bowen | ................ | G06F 17/5022 703/22 |
| 2006/0015863 A1 * | 1/2006 | Vaidyanathan | ....... | G06F 9/4443 717/170 |
| 2007/0106975 A1 * | 5/2007 | DeLine | ..................... | G06F 8/34 717/106 |
| 2008/0062141 A1 * | 3/2008 | Chandhri | .............. | G06F 3/0482 345/173 |
| 2008/0077910 A1 * | 3/2008 | Ohta | ......................... | G06F 8/20 717/113 |
| 2012/0297364 A1 * | 11/2012 | Wehrwein | .................. | G06F 8/75 717/123 |
| 2013/0346942 A1 * | 12/2013 | Bragdon | ................... | G06F 8/33 717/113 |

(Continued)

*Primary Examiner* — Lewis A Bullock, Jr.
*Assistant Examiner* — Mohammad H Kabir
(74) *Attorney, Agent, or Firm* — Schwegman Lundberg & Woessner, P.A.

(57) ABSTRACT

A software development environment receives an input string from a user, and searches for the input string in a plurality of program code files. The system then displays a result of the scope of the search on a viewport of a display unit, wherein the search result includes miniature views of the program code files. In an embodiment, the search result on the viewport of the display unit includes equally-sized tiles. In another embodiment, the result on the viewport of the display unit includes a set of closely-packed blocks with a varying compression rate applied to the closely-packed blocks.

15 Claims, 16 Drawing Sheets

(56) References Cited

U.S. PATENT DOCUMENTS

2015/0313578 A1* 11/2015 Yu .................... A61B 8/565
600/459
2016/0093232 A1* 3/2016 Chong ................ G09B 19/06
434/118

* cited by examiner

```
16  oToolbar : null,
17  _mItemToCommandMappin : {},
18  _mSplitButtonMapping : {}
19  _mComboBoxGroupMapping : {},
20
21  init : function() {
22      //TODO PeterM: rework requiring of ui5 dependencies
23      jQuery.sap.require("sap.ui.core.IconPool");
24      this._oMenuService = this.context.service.menu;
25      this._oCommandGroupService = this.context.service["commandGroup"];
26      this._oCommandService = this.context.service["command"];
27      this._oToolbar = new sap.ui.commons.Toolbar();
28  },
29
30  getContent : function() {
31      return this._oToolbar;
32  },
33
34  configure : function(mConfig) {
35      var that = this;
36      var aPromises = [];
37      var that = this;
38      return this._oCommandGroupService.getGroup(mConfig.group)
39      if (!oGroup) {
40          fnError("Configured group '" + mConfig.group + "'"
41      }
```

FIG. 12

PATTERN RECOGNITION OF SOFTWARE PROGRAM CODE IN AN INTEGRATED SOFTWARE DEVELOPMENT ENVIRONMENT

TECHNICAL FIELD

The present disclosure relates to software development and software development management, and in an embodiment, but not by way of limitation, a system and method for pattern recognition of software program code in an integrated software development environment.

BACKGROUND

In the context of a software development environment, searching for a certain string or pattern in many textual program code files is a common task. This task, and especially its representation on a user interface, becomes challenging when a large program code database is in the search scope.

BRIEF DESCRIPTION OF THE DRAWINGS

Some example embodiments of the present disclosure are illustrated by way of example and not limitation in the figures of the accompanying drawings, in which like reference numbers indicate similar elements, and in which:

FIG. 12 illustrates an example of a code-preview feature.

DETAILED DESCRIPTION

Figures 1, 2:
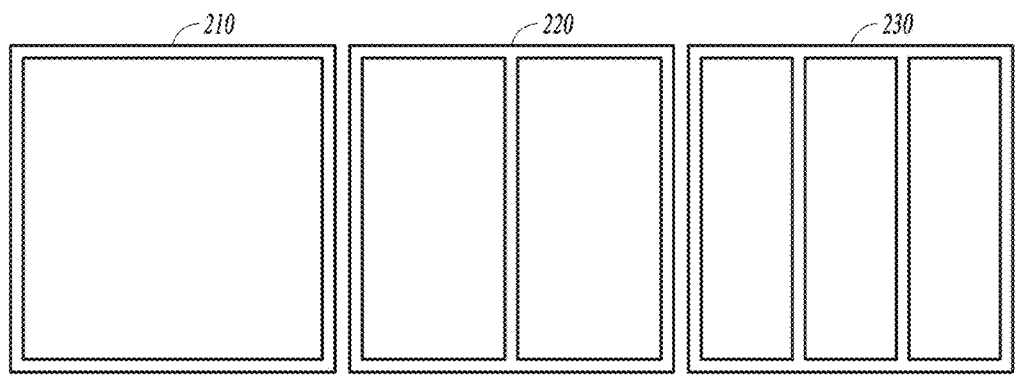
FIG. 1 illustrates an example of reducing a segment of a program code file into a miniature view.
FIG. 2 illustrates an example of tiles that can be used to display program code file search results.

Example methods and systems of displaying results of a search of a software code database are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a graphical user interface (GUI) is caused to be displayed in a viewport of a display unit of a computing device of a user. The GUI is configured to enable the user to submit a search string, and to search a program code database containing a plurality of program code files for that search string. The results of the search are then displayed as a miniaturized view in the viewport of the GUI in either equally sized tiles or closely packed and compressed blocks. In some example embodiments, the search for the search string is triggered in response to a user-generated interrupt corresponding to an input of the search string provided by the user via the GUI.

The methods or embodiments disclosed herein may be implemented as a computer system having one or more modules (e.g., hardware modules or software modules). Such modules may be executed by one or more processors of the computer system. In some example embodiments, a non-transitory machine-readable storage device can store a set of instructions that, when executed by at least one processor, causes the at least one processor to perform the operations and method steps discussed within the present disclosure.

An important task in software development projects is finding a string or pattern somewhere in the program code files. In an embodiment, the task of searching for a particular program code segment or program code term is structured in three steps. First, the search scope is defined. For example, the search scope can include all files with a certain extension in a certain software project, an entire workspace, all files ending with a certain file extension, all files that are currently open in an integrated development environment (IDE), all files that are currently closed in the IDE, etc. Second, the search term or phrase is received from a user, thereby triggering the search action. Third, the search results are displayed and analyzed by the user. The search scope is often kept stable for a sequence of several search actions.

There are at least two related representations of the search scope, both of which are based on miniature views of the examined program code files. These representations are used for a spatial display of the resulting hits and are combined with a code preview via linking and brushing. The first representation includes equally sized tiles. A tile is a display of the program code file that was located in the search. The equally sized tiles work well for a relatively small number of files. The second representation includes closely packed blocks that are projected with a non-affine transformation (comparable to a fisheye lens) to a viewport on a display unit. In an embodiment, the second representation is generated without scrollbars.

The search results provide to the user a spatial impression that can be explored and easily remembered if the search scope is a project without much change, since the visual or pattern representation will then also hardly change. This task is supported in popular Code Editors (such as Notepad++, Sublime Text, etc.) or in Integrated Development Environments (IDE) (like Eclipse or MS Visual Studio). However, these current products do not create an explicit representation of the search scope, nor even display the sheer number of examined files. Current products typically generate long hierarchical lists for the resulting hits. These long hierarchical lists are not well-suited for supporting a typical search-as-you-type approach where the user inherently expects something out of the hits while refining the search. In existing tools, the definition of the scope where to search and the search term itself are typically combined. After performing the search, a user receives information such as "X matches across Y files". However, the user doesn't know the actual size of the files that have been examined. Besides the Sublime Text tool, a user doesn't even know the number of files. A spatial view as disclosed herein is helpful in this aspect.

In the current products, to identify the desired match in the list of search results, some lines of code around the rows with hits are automatically provided or provided on request. This paradigm is purely text-based. It relies entirely on the user's ability to painstakingly read through the lines of text. However, human beings in general have various skills, and in at least some instances they recognize patterns or pictures even if these patterns or pictures are small or fuzzy. For example, a user can be tasked with looking for an image with a certain person in the image among thousands of images on the user's PC. In such a case, the filenames may not be meaningful (which is typically the case for photos from smartphones or cameras). This task can be managed quite well however if the image files are not displayed as a list of filenames, but are displayed as thumbnails or icons that provide some, although not all, information on the content. The user could then quickly find the (hopefully small number of) reasonable candidates that deserve further examination by opening them in an image viewer. This human skill can be applied to identifying areas in a long program code file by showing a miniature view of the file. With such a view, a user receives a rough spatial (or pattern) impression and can quickly locate areas with characteristic structures, such as deeply nested conditional statements or long switch-statements.

In an embodiment, the search results are represented by equally-sized tiles, with each tile showing a miniature view of a program code file. The tiles are then displayed as a grid in a viewport of a display unit. A vertical scrollbar can be included if necessary. The tiles can be ordered (e.g., first from left-to-right, then from top to bottom) where the number of left-to-right displayed tiles is determined by a certain horizontal space. To avoid horizontal scrollbars, this space can be calculated from the available space of the particular viewport of the display unit.

In another embodiment, in order to avoid the use of a scrollbar, the search results can be represented by closely-packed blocks, wherein each block shows a miniature view of a program code file, wherein the closely-packed blocks are projected to the finite viewport of the display unit. By using the additional pattern knowledge about the program code, the software developer or other user can locate the actual search hits much faster in these representations than in a textual list or tree representation.

In an embodiment, an order of the search scope is defined. That is, the files are placed into a reasonable order by "importance". In a typical IDE, a workspace is organized in a hierarchical structure with projects and folders. This structure is typically hand-crafted and quite stable. It's useful for finding single files with known names and locations via using the known structure and stepwise-expanding of the hierarchical tree. For directly displaying a defined set of files, it doesn't matter whether this set is regarded as a "search scope" or as "files containing search results," the hierarchical structure is an inconvenient format. There are several possibilities to "flatten" such a tree—either an alphabetical order or according to their appearance in an algorithmic tree traversal like "depth-first search." But these techniques are based on static criteria not reflecting a user's work. An embodiment therefore utilizes a new concept of "sorting by personal relevance." If there is a subset of all files of the workspace in a list, that list can be ordered sequentially by the following criteria in descending order. First, is the file currently open? If the file is currently open, the order in which the files were opened can be used as the order criteria. Second, has the file been "recently" been changed and/or saved by the user? A time period can be chosen to define recently such as one day, two days, one week, two weeks, one month, etc. Third, the criteria can be the total time that a file has been opened during a particular time period, such as two weeks. For example, during the past two weeks, a first file may have been open for a total time of two hours (not necessarily a continuous two hour period), while a second file may have been open during this two week period for a total time of three hours. The first and second files can then be ordered based on this difference in the time each was open during the two week period. Fourth, the number of lines in a program code file can be considered, with program code files having a greater number of lines given preference over program code files with a smaller number of lines or vice versa.

As noted above, the equally-sized tile embodiment works well with relatively small number of program code files. The program code segments located in a search are represented by equally-sized tiles, similar to an "Icon View" on a PC Desktop or a mobile device. In a first step, a miniature view of a program code file is created in a tile. For a visual representation of a file as a miniature view, the program code file is traversed line by line. For a program code line, the position of the first and the last non-whitespace character are calculated. With this information, a bar or other highlighting can be rendered between two points representing the program code line. In an embodiment, additional information such as color coding, inner white space, and different heights of characters can be used. If all these lines are rendered below each other, a picture is generated showing the outline of the file as is illustrated for example in FIG. 1. In FIG. 1, the program code at 110 is reduced to a miniature view at 120. The program code is too small to read at 120, but as disclosed above, a purpose of the miniature view of the program code is to visually identify certain program structures or patterns, such as deeply nested loops, case/switch statements, long paragraph-like comments, or other program code constructs, which are still identifiable in the miniature view 120. The visual identification can be programmatically automated.

Figure 3:
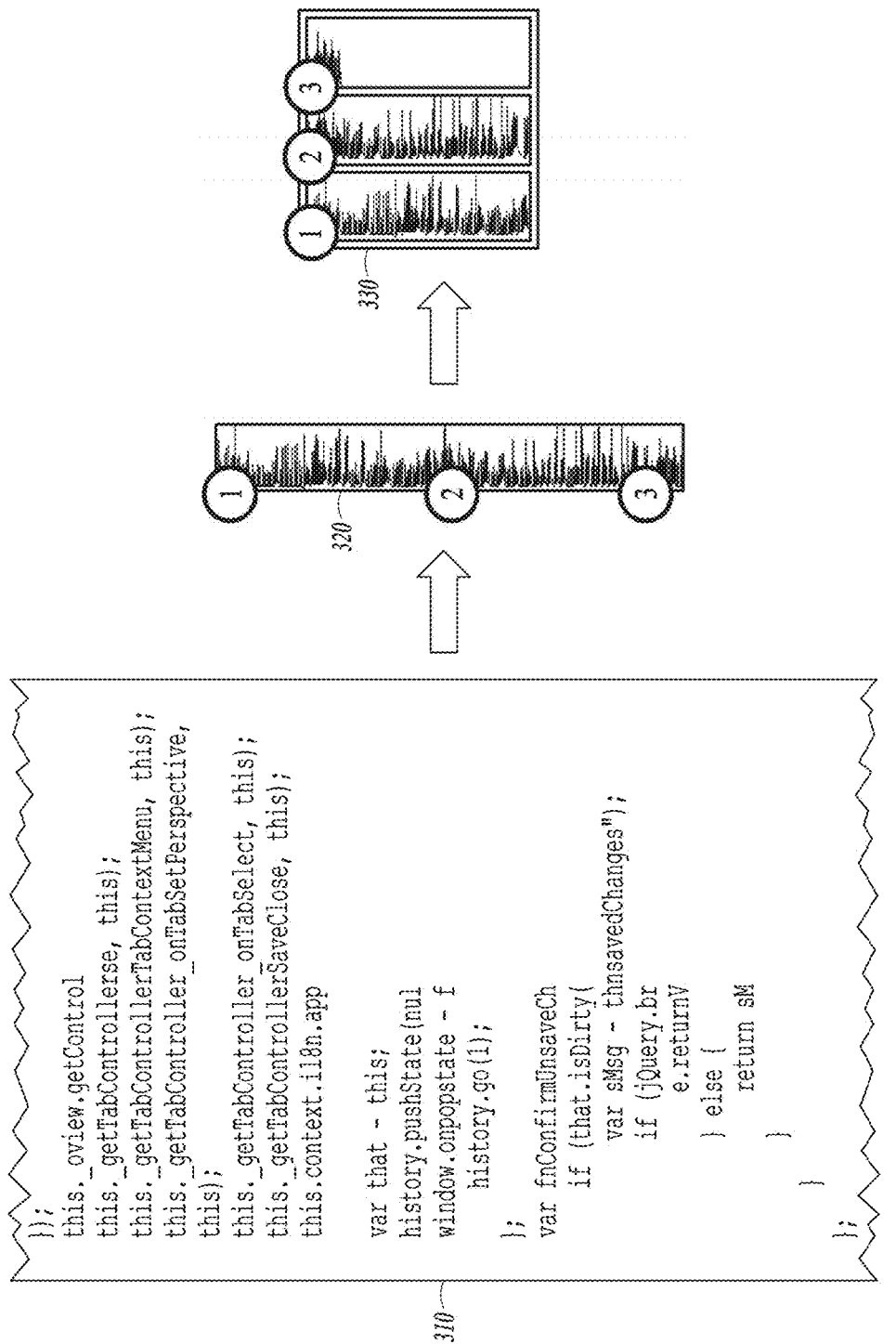
FIG. 3 illustrates an example of miniaturizing program code and placing the miniaturized program code into tiles.
Figure 4A:
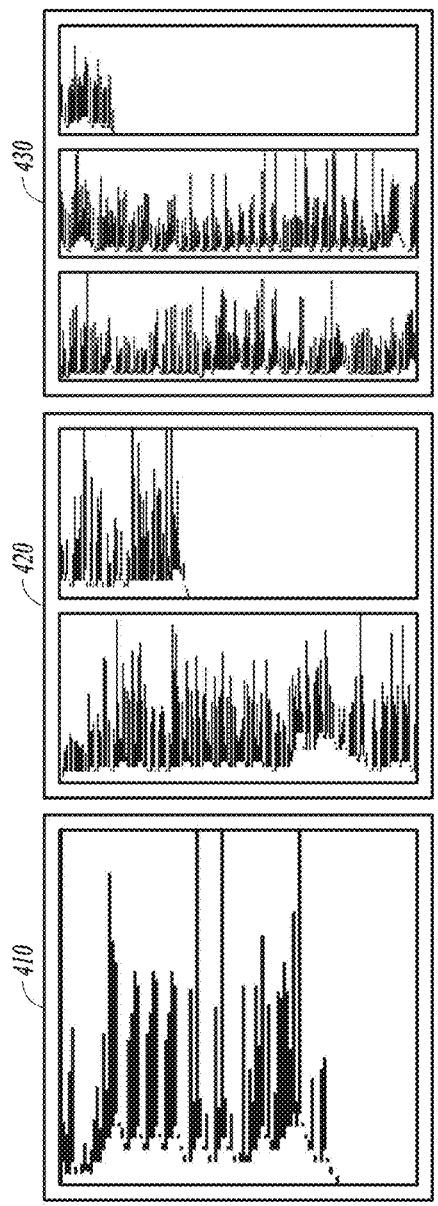
FIGS. 4A and 4B illustrate the layout of several examples of equally-sized tiles on a viewport of a display unit.
Figure 4B:
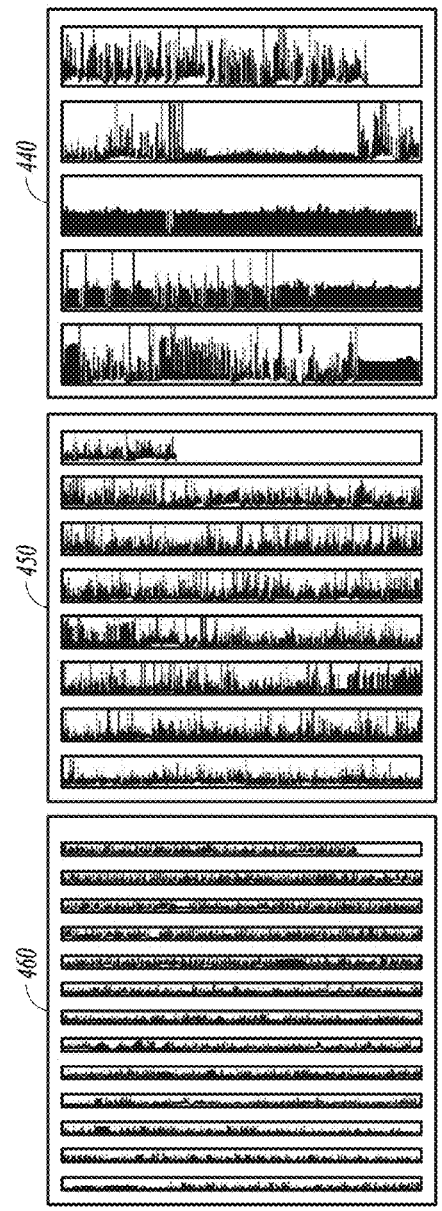

This miniature view 120 is then placed inside of a tile. The tiles have a certain size that is given. The tile size may be a constant, or it may be calculated from the available space in the viewport of the display unit. As illustrated in FIG. 2, tiles 210, 220, or 230 are regarded as containers for a certain number of columns, wherein each column uses the full height of the tile and an equal portion of the width of a tile. Depending on the number of lines in a file, an additional compression factor can be calculated. Referring to FIG. 3, the program code 310 is then miniaturized as illustrated at 120 in FIG. 1, compressed and rendered into the miniature view illustrated in 320, and then placed into side by side columns in a tile as illustrated at 330. FIGS. 4A and 4B illustrate the layout of several examples of equally-sized tiles on a viewport of a display unit. The more lines that are in the program code file, then the more columns are needed. For example, the display of 410 represents a program code file that has approximately 100 lines of code, the display at 420 represents a program code file that has approximately 300 lines of code, the display at 430 represents a program code file that has approximately 750 lines of code, the display at 440 represents a program code file that has approximately 3000 lines of code, the display at 450 represents a program code file that has approximately 7500 lines of code, and the display at 460 represents a program code file that has approximately 20000 lines of code. When displaying the equally-sized tiles, depending on the number of program code files (and hence the number of tiles), it might be necessary to vertically scroll the viewport. Due to the ordering as disclosed above, the equally-sized tiles of the "important" files should be initially visible without scrolling.

Figure 5:
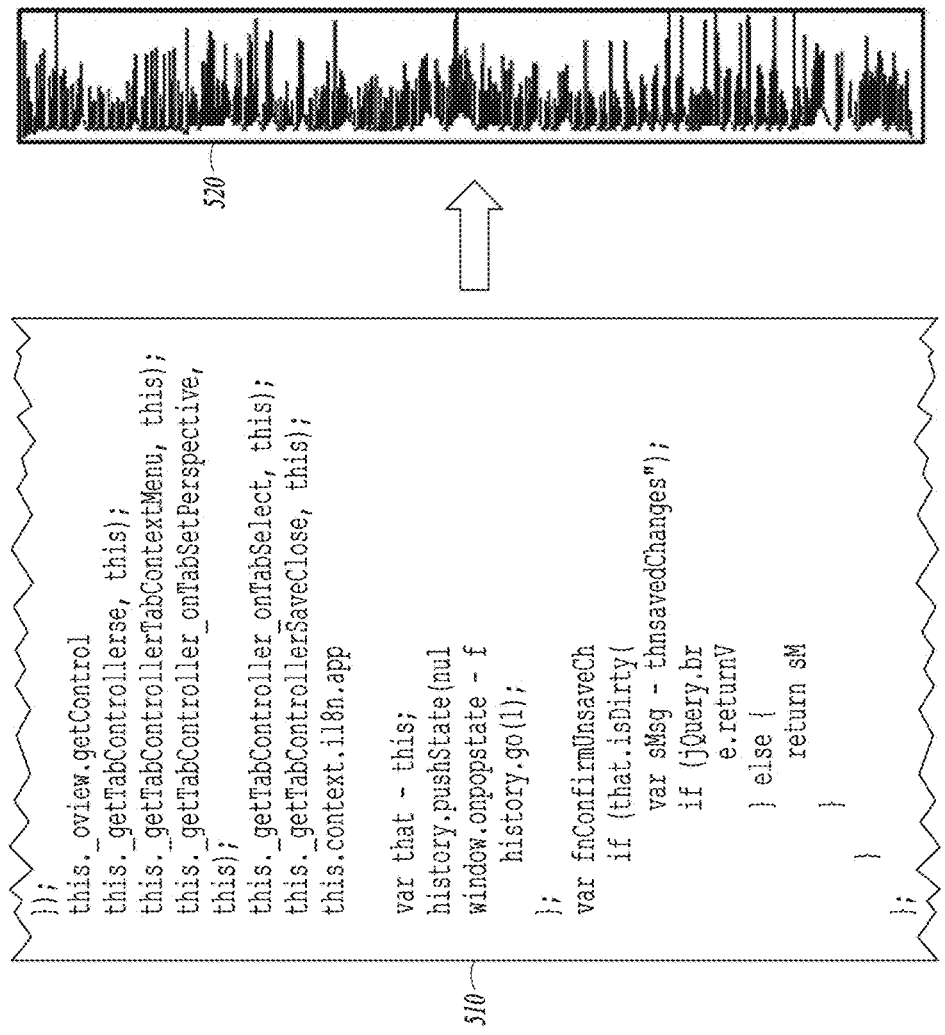
FIG. 5 illustrates an example of the creation of a miniaturized block from a segment of program code.

In another embodiment, closely-packed blocks are used to display the results of the search through the program files. The use of closely-packed blocks is beneficial for fitting a large amount of program code files to the viewport of a display unit. The search results are represented by such "closely-packed blocks" that contain the miniature views. First, as illustrated in FIG. 5, a miniature view 520 of a program code file 510 is created in a block. Initially, it is assumed that there are no problems with space on the viewport. The file is rendered as described in connection with FIG. 1, and the result can simply be referred to as a block. This rendering is executed for every file in the scope of a search and this produces a set of blocks. Next, the blocks are distributed in an imaginary, infinite canvas. The distribution of the blocks can be according to the ordering of the search scope.

Figure 6:
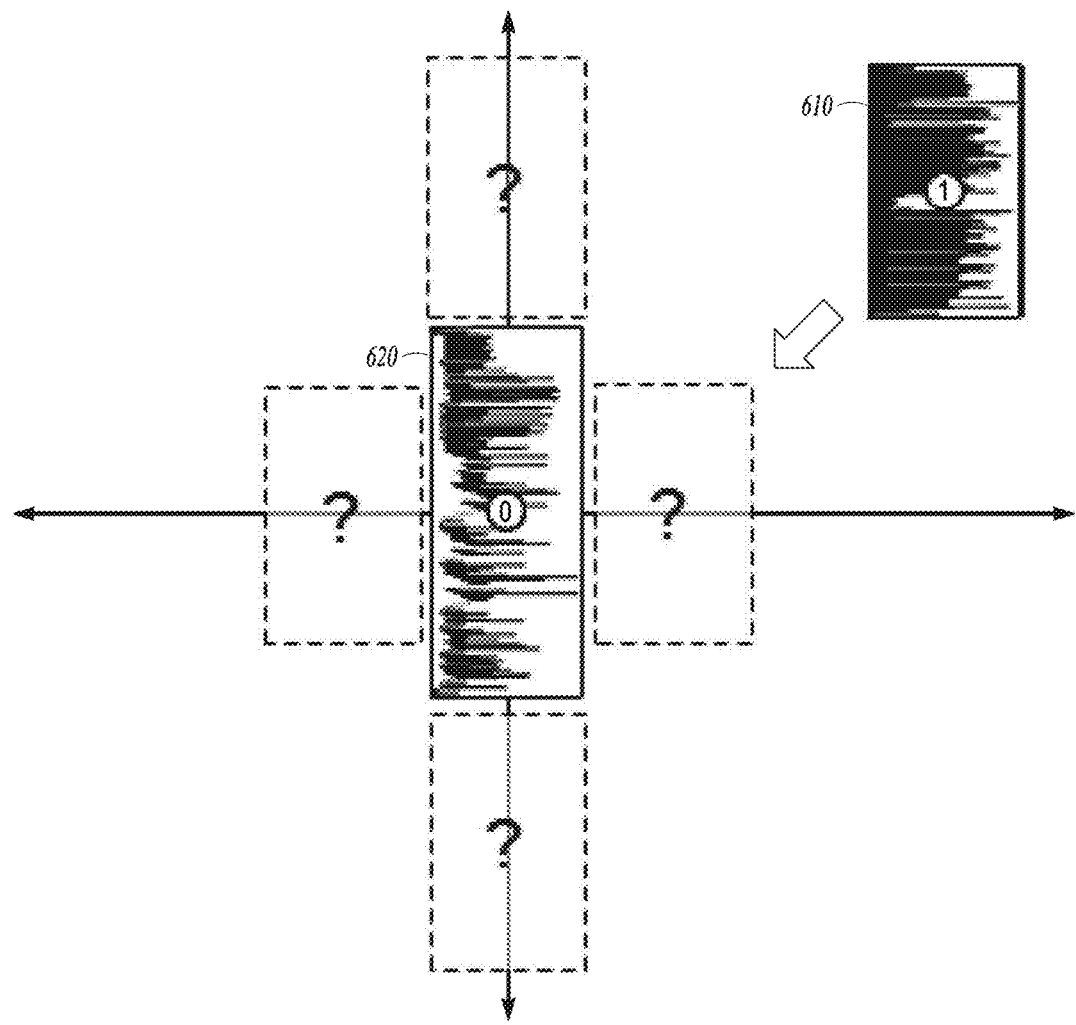
FIG. 6 illustrates an example of an initial placement of a block at the center of a viewport of a display unit.
Figure 7:
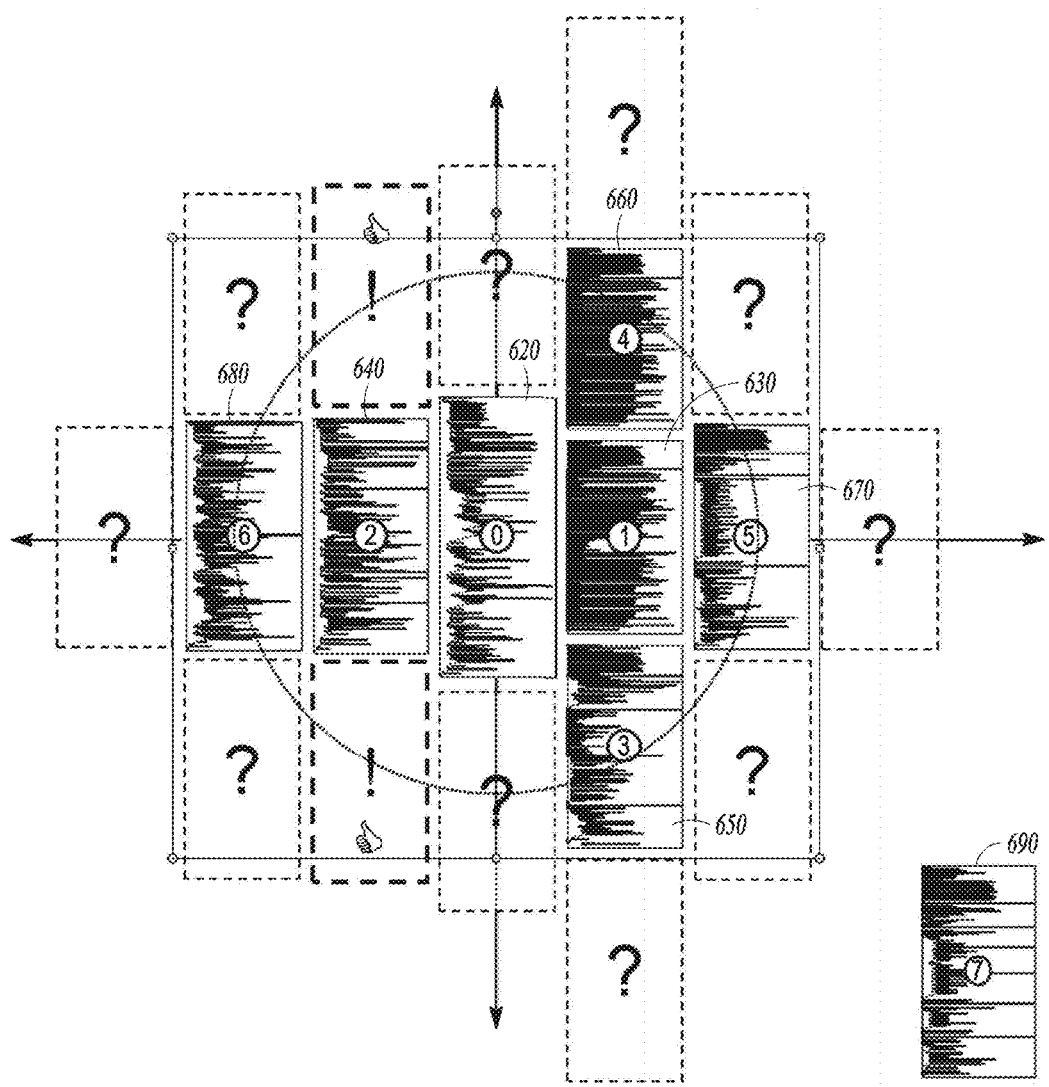
FIG. 7 illustrates an example of placing additional blocks around an initially placed block on a viewport of a display unit.

Referring to FIG. 6, a first block 610 is placed at the center 620 of the infinite canvas (or viewport of the display unit). This means that the midpoint of the block is exactly above the origin of the viewport. This is the initial structure. After the initial block is placed, the next block is placed by identifying the possible adjacent places for this next block as follows, and as illustrated in FIG. 7. The next block can be placed either to the left or the right of the initial block 620, or above or below the initial block 620. The placement of the next block should not obscure (i.e., not overlap) any portion of the initial block 620. Considering the possible positions of the next block (left, right, up, down), the place with the least distance from its midpoint to the origin is calculated, and the next block is placed there. In the example of FIG. 7, this is block 630 that is placed to the right of block 620. This is repeated for each next block, which in the example of FIG. 7 results in the placing of blocks 640, 650, 660, 670, and 680. After the placement of block 680, block 690 is ready to be placed.

Figure 8:
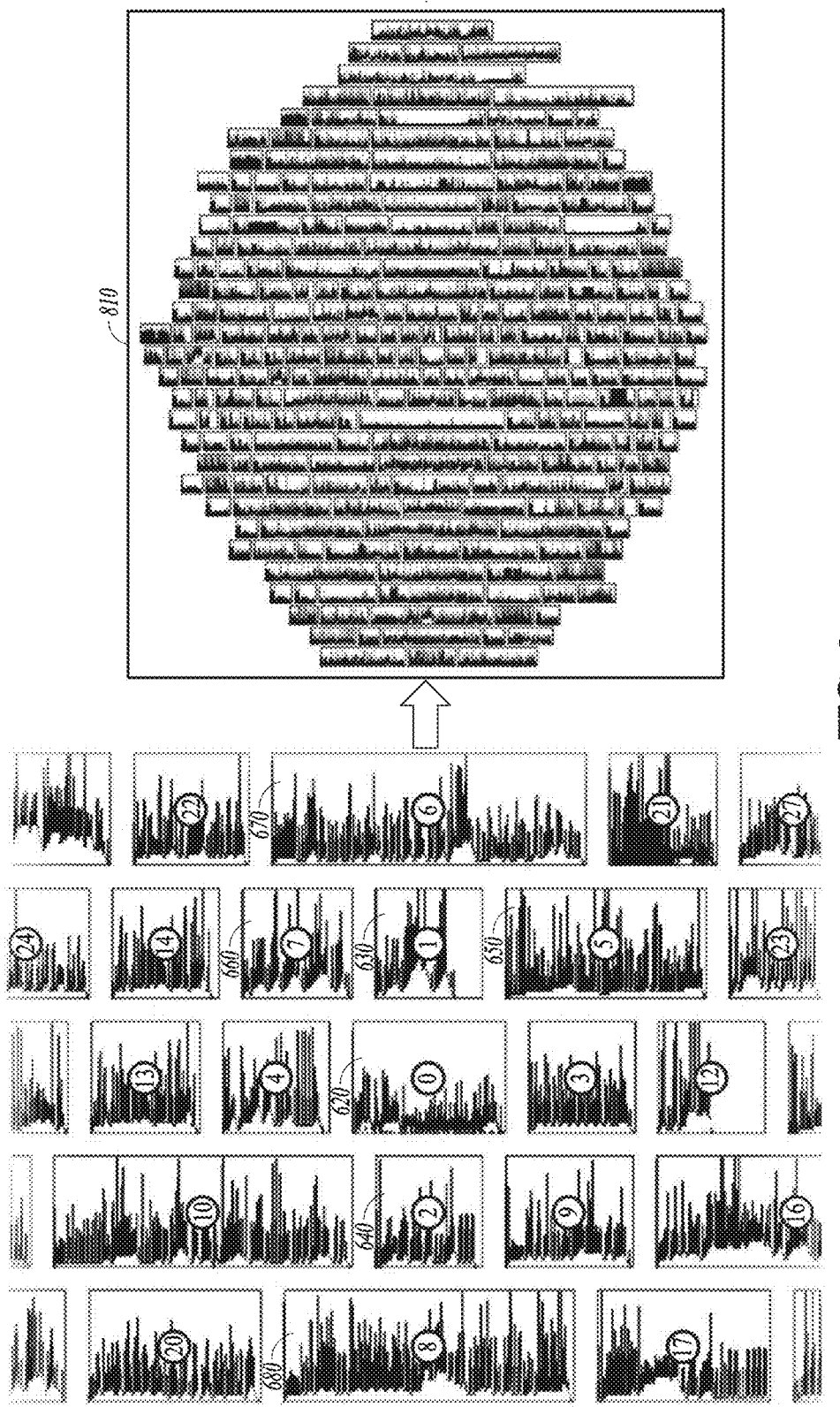
FIG. 8 illustrates an example of a projection of an imaginary infinite canvas onto a finite viewport of a display unit.
Figure 9:
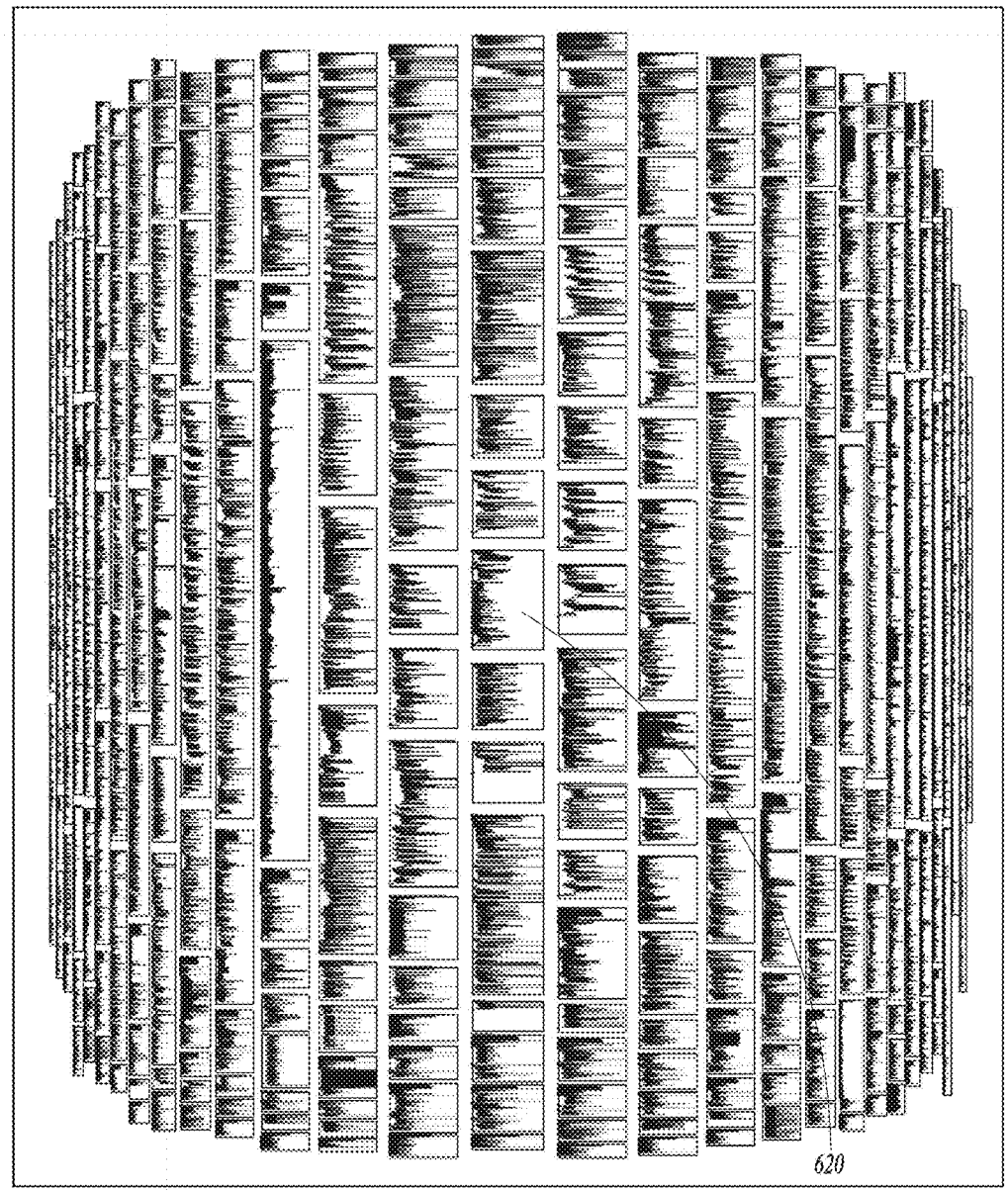
FIG. 9 illustrates an example of a non-affine projection with an increasing compression rate as the distance to the origin of a display unit increases.

At this point, the imaginary infinite canvas is projected onto a finite viewport 810 as illustrated in FIG. 8. Regarding the size and the number of the blocks, the structure build-up as described in connection with FIGS. 6 and 7 can exceed any boundary, which is a reason that the imaginary infinite canvas is used. However, there may be a desire to render this structure in a finite viewport without the need to introduce a scrollbar. In a first embodiment, an affine projection (i.e., a constant compression rate) is performed on both dimensions, which squeezes the structure into the viewport. A concern with this embodiment is that the projected blocks might all become unusable small (i.e., structures would not be recognizable). In a second embodiment, a non-affine projection is performed, but with an increasing compression rate as the distance from the origin increases. The distance from the origin can be calculated in both directions (i.e., x and y directions). The result is illustrated in FIG. 9. As before, the blocks near the center represent the more "important" files (i.e., currently open files, recently changed/saved files, total time a file has been open, and number of lines in a file), and the more important files in the center are rendered as larger blocks, such that structures or patterns can be more easily recognized.

Figure 10:
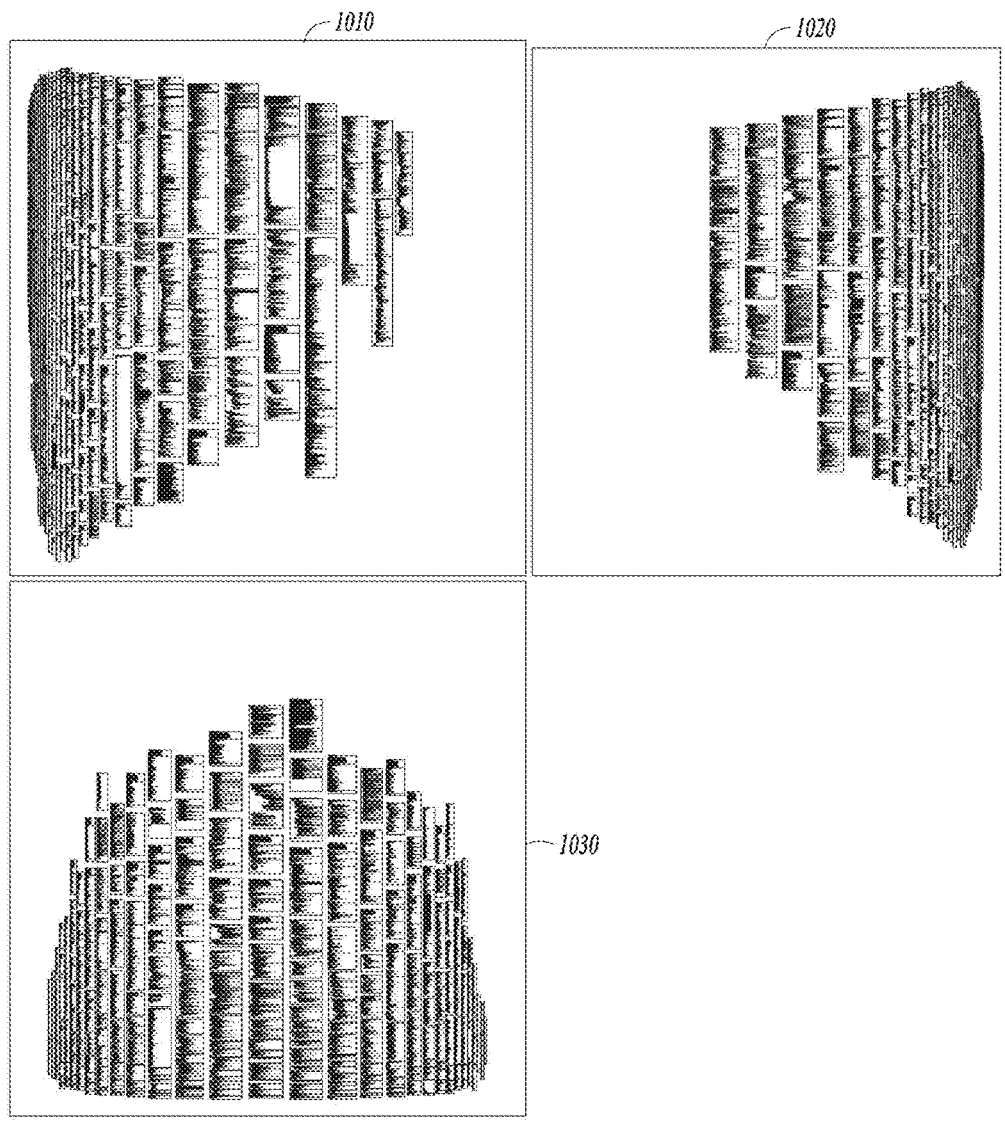
FIG. 10 illustrates an example of shifting the non-affine projection of FIG. 9.
Figure 11:
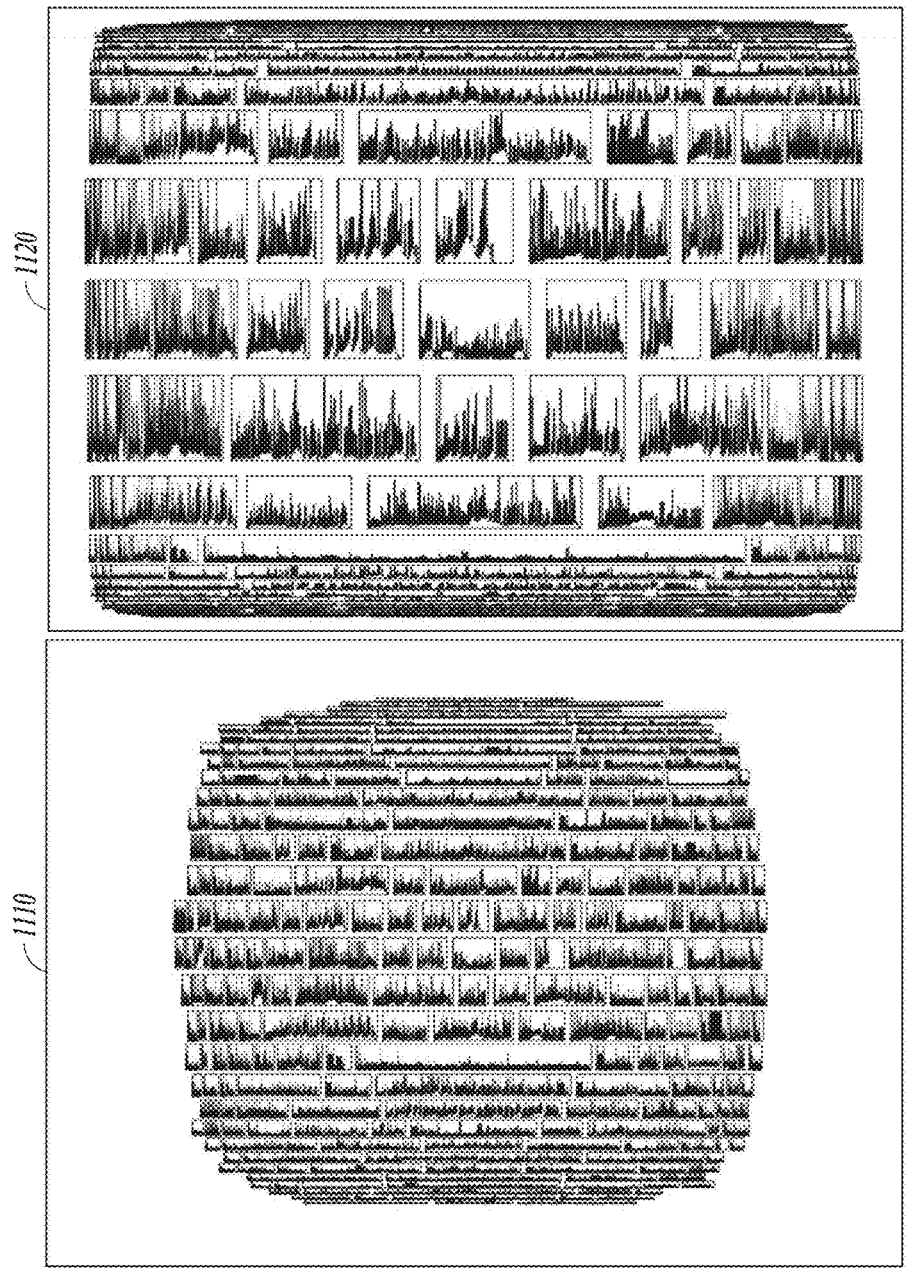
FIG. 11 illustrates a zoom-in and zoom-out of the non-affine projection of FIG. 9.

In FIG. 9, there is no need to scroll the displayed structure because all blocks are displayed on the viewport. However, the blocks near the border might be too small to recognize any program structures or patterns. A feature therefore "moves" the structure over the infinite canvas before the projection. With this interaction, other areas can be moved to the center for better visibility. Another feature permits the shifting of a certain block to the center, as illustrated in FIG. 10. FIG. 10 illustrates at 1010 the shifting of a block from the right side of the viewport to the center of the viewport. FIG. 10 illustrates at 1020 the shifting of a block from the left side of the viewport to the center of the viewport. FIG. 10 illustrates at 1030 a shifting of a block from the top of the viewport to the center of the viewport. Furthermore, as illustrated at 1110 and 1120 in FIG. 11, a zoom-in and zoom-out feature of the structure before the projection can be made available. The zoom-in and zoom-out emphasizes/de-emphasizes the center thereby giving less/more space to the blocks near the outer rim.

Linking and brushing are principles commonly used in information visualization to describe a connection between two or more views of the same data. Linking and brushing were first introduced by Becker and Cleveland to brush scatterplot matrices. In that early analog case of data representation, brushing over a node on one graph highlighted related points on the other graphs. To enable search results for linking and brushing, an embodiment, as illustrated in FIG. 12, shows the actual text file 1210 when brushing (i.e., hovering) over search result list items 1220 or brushing over any portion of a tile or block. This linking and brushing not only highlights the relation between the search results, it additionally serves as a lightweight preview providing a quick gaze into the program code file, which provides valuable feedback on how the program code file looks as a whole. Additionally a click on a search result representation makes the editor preview "sticky" and thus editable. Depending on the vertical mouse position above the rendered lines, the corresponding starting line number in the program code file for the preview is calculated. For a reasonable feedback, the area representing the part of code currently shown in the preview viewport gets a distinguishable visualization. The tile (or block) that is actually hovered over gets a different background coloring and a standard background color is used for the previewed part (but only if it's not representing the whole file).

Linking and brushing are very lightweight, fast responding operations. There are cases however where a user would like to stop this permanent refresh. Therefore, in an embodiment, a selection operation implements a mode change that freezes the preview viewport. The corresponding area is then shown a different visualization, such as a darker background color and inverted color of the rows, and depending on the mouse position, a small preview in an overlay window can be displayed. In this manner, different parts of the program code file can be compared. The mode can be switched back to linking and brushing. In another embodiment, vertical scrolling in the preview viewport with a conventional scrollbar can be mirrored in the tiles/blocks viewport.

Figure 13:
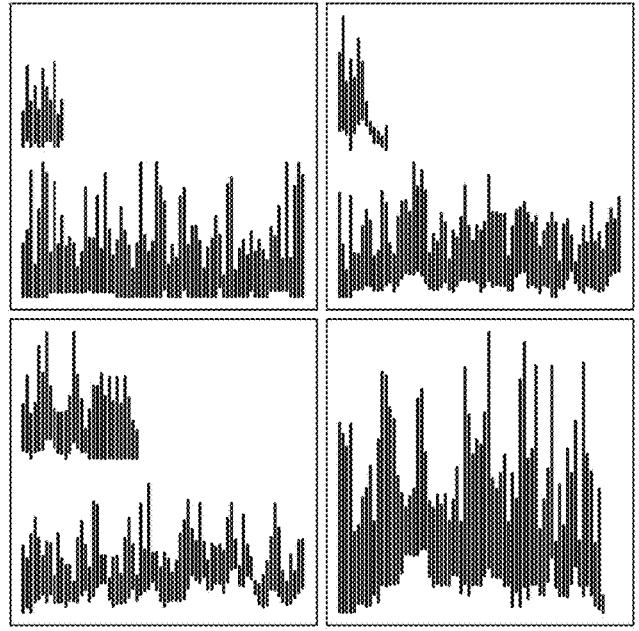
FIG. 13 illustrates another example of a code-preview feature.

The search result can be refreshed after every keystroke. As illustrated in FIG. 13, the search result is displayed as follows. The tiles/blocks 1310 representing a file containing a search hit get a different background color. The lines in these tile/blocks containing a search hit are replaced by a line spanning the whole column/block with a different color, as at 1320. The positions in these lines where the search hits are located are marked with constant sized rectangles 1330, which ignore the effects of projection. The same color can be used for these three emphases, differentiated by opacity.

The visual appearance of the tiles and/or blocks are kept stable for a certain scope, especially during the refinement of a search. This stability saves a lot of rendering effort because only the highlighting has to be re-rendered. However, after having finished the refinement, the user is given the option to dynamically change the "importance order" of the tiles and/or blocks by moving the program code files with hits to the top of the list.

Figure 14:
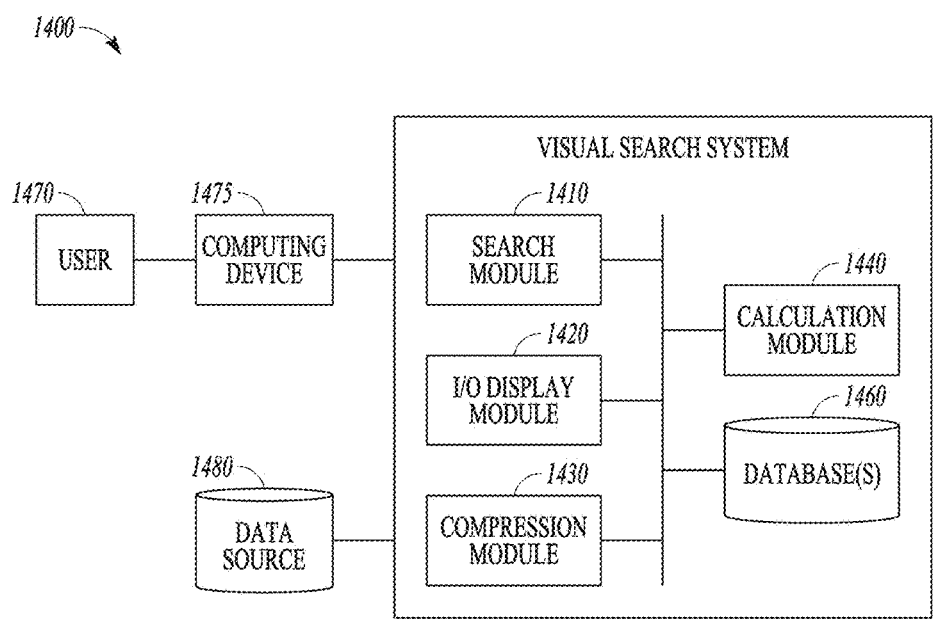
FIG. 14 illustrates an example embodiment of a pattern matching search system.

FIG. 14 is a block diagram illustrating components of a visual search system 1400, in accordance with some example embodiments. In some example embodiments, the visual search system 1400 comprises any combination of one or more of a search module 1410, I/O display module 1420, a compression module 1430, a calculation module 1440, and one or more databases 1460. The modules 1410, 1420, 1430, and 1440, and the database(s) 1460 can reside on a machine having a memory and at least one processor (not shown). In some example embodiments, the modules 1410, 1420, 1430, and 1440, and the database(s) 1460 reside on the same machine, while in other example embodiments, one or more of the modules 1410, 1420, 1430, and 1440, and the database(s) 1460 reside on separate remote machines that communicate with each other via a network (e.g., network 1626 in FIG. 16). In some example embodiments, the modules 1410, 1420, 1430, and 1440, and the database (s) 1460 can be incorporated into an enterprise application platform. However, it is contemplated that other configurations are also within the scope of the present disclosure.

In some example embodiments, the search module 1410 defines the search scope, orders the search scope, and executes the search through the program code files. The program code files can be stored in the data source 1480 and/or the databases 1460. The results of the searches can be displayed on a GUI of the computing device 1475, for review by the user 1470. Examples of the computing device 1475 include, but are not limited to, a desktop computer, a laptop computer, a tablet computer, and a smartphone.

In some example embodiments, the I/O display module 1420 processes input from the user 1470 (such as a search term or search string), displays the search results on the GUI of the computing device 1475, zooms in and zooms out the results on the display, and moves the display about the center of the viewport. The compression module 1430 handles the compression of the closely-packed blocks, and works in conjunction with the I/O display module 1420 in the display of those closely-packed blocks on the GUI of the computing device 1475. The calculation module 1440 can handle, for example, the calculation of the number of columns in the equally-spaced tiles.

Figure 15A:
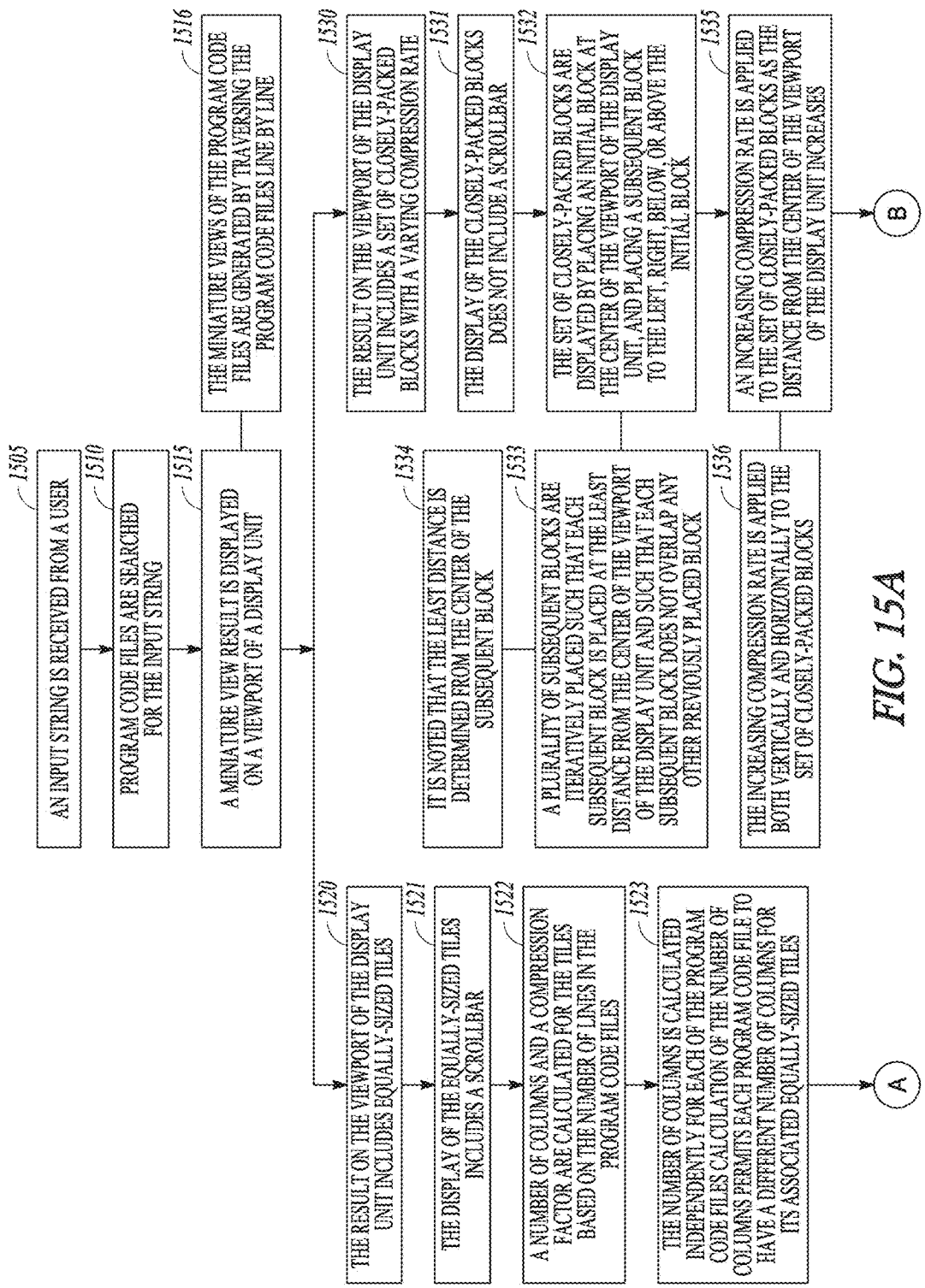
FIG. 15 is a block diagram illustrating operations and features of an example embodiment of displaying results of a search of a software program code database.
Figure 15B:
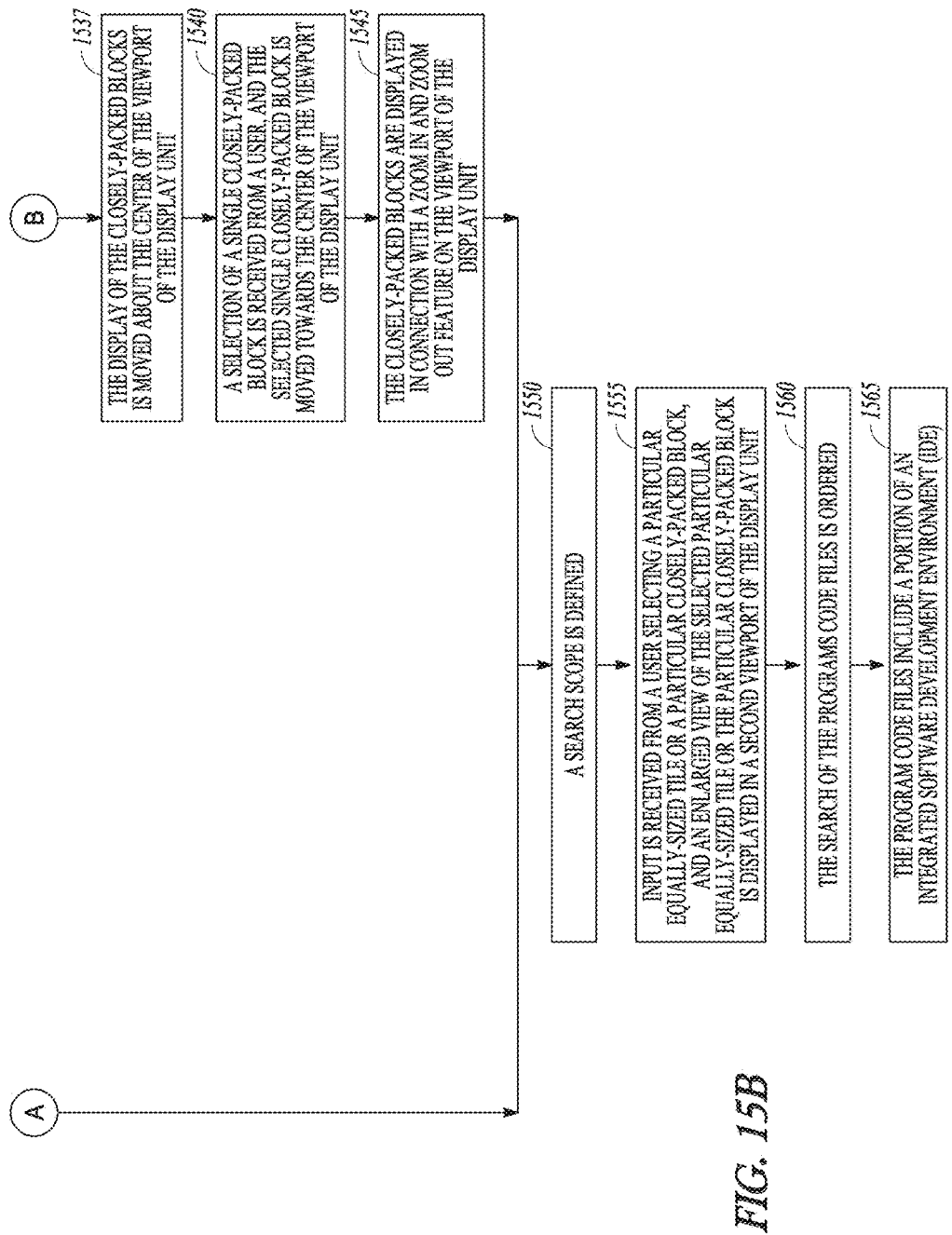

FIG. 15 is a block diagram illustrating operations and features of an example embodiment of displaying visual results of a search of a software program code database. FIG. 15 includes a number of process blocks 1505-1565. Though arranged serially in the example of FIG. 15, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 15, at 1505, an input string is received from a user, and at 1510, program code files are searched for the input string. At 1515, a result of the search for the input string is displayed on a viewport of a display unit. The result includes miniature views of the program code files. The display of the result represents the search scope. At 1516, the miniature views of the program code files are generated by traversing the program code files line by line. As explained above, this is accomplished by, for example, calculating the position of the first and last non-white space characters in the lines of the program code file.

As indicated at 1520, the result on the viewport of the display unit includes equally-sized tiles. As indicated at 1521, the display of the equally-sized tiles can include a scrollbar. Since not all of the tiles can be displayed on the viewport at one time, the scrollbar allows a user to scroll through all of the tiles, including tiles not currently displayed on the viewport. At 1522, a number of columns and a compression factor are calculated for the equally-sized tiles based the number of lines in the program code files. The compression factor is a function of the size of the viewport and the size of the program code files in the search scope. In general, as the size of the program code files increases, the number of columns and the compression factor increase. At 1523, the number of columns is calculated independently for each of the program code files. This independent calculation of the number of columns permits each program code file to have a different number of columns and a different compression factor for its associated equally-sized tiles.

As indicated at 1530, the result on the viewport of the display unit includes a set of closely-packed blocks with a varying compression rate applied to the closely-packed blocks. In an embodiment, as indicated at 1531, the display of the closely-packed blocks does not include a scrollbar, since as illustrated in FIG. 9 for example, all of the closely-packed blocks from a particular search are displayed on the viewport.

At 1532, the set of closely-packed blocks are displayed by placing an initial block at the center of the viewport of the display unit, and placing a subsequent block to the left, right, below, or above the initial block. The subsequent block is placed a least distance from the center of the viewport of the display unit. At 1533, a plurality of subsequent blocks are iteratively placed such that each subsequent block is placed at the least distance from the center of the viewport of the display unit and such that each subsequent block does not overlap any other previously placed block. At 1534, it is noted that the least distance is determined from the center of the subsequent block. At 1535, an increasing compression rate is applied to the set of closely-packed blocks as the distance from the center of the viewport of the display unit increases. This increasing compression rate results in a display of the blocks as illustrated in FIG. 9, wherein the closely-packed blocks at the edges of the viewport are more compressed than the closely-packed blocks in the center of the viewport. At 1536, the increasing compression rate is applied both vertically and horizontally to the set of closely-packed blocks. The application of the increasing compression rate of course results in a compressed display of the program files in both the horizontal and vertical directions as is illustrated in FIG. 9. At 1537, and as illustrated in FIG. 10, the display of the closely-packed blocks is moved about the center of the viewport of the display unit. This movement of the closely-packed blocks increases the size of a particular closely-packed block as the particular closely-packed block moves toward the center of the viewport of the display unit. This increase of size of the closely-packed block as it moves towards the center of the display unit makes it easier to recognize or programmatically detect any program code structures or patterns in that particular block.

At 1540, a selection of a single closely-packed block is received from a user. In response to the user selection, the selected single closely-packed block is moved towards the center of the viewport of the display unit. The movement of the selected closely-packed block to the center of the viewport decreases the compression of the selected block and makes it easier for a user to identify particular programmatic structures in the selected closely-packed block. At 1545, the closely-packed blocks are displayed in connection with a zoom in and zoom out feature on the viewport of the display unit.

At 1550, a search scope is defined that includes program code files with a particular extension, program code files categorized in a certain project, program code files currently open in a workspace, program code files currently closed in the workspace, and/or all program code files in an entire workspace. This feature allows a user to narrow or expand a search based on the types of program code files, the projects with which certain program code files are associated, and the current status of the program code files. Other criteria could also be used depending on the needs of the particular user.

At 1555, input is received from a user selecting a particular equally-sized tile or a particular closely-packed block. An enlarged view of the selected particular equally-sized tile or the particular closely-packed block is displayed in a second viewport of the display unit, thereby generating a code preview of the particular equally-sized tile or the particular closely-packed block.

At 1560, the search of the programs code files is ordered as a function of currently opened program code files and when the currently opened program files were opened, program code files that have been changed or saved, a total amount of time that each particular program code file has been opened over a defined time period, and/or the number of lines in each particular program code file. This feature permits a user to order a search scope based on current status of a program code file, change history of a program code file, extent of use of a program code file, and size of a program code file.

At 1565, the program code files include a portion of an integrated software development environment (IDE).

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 16:
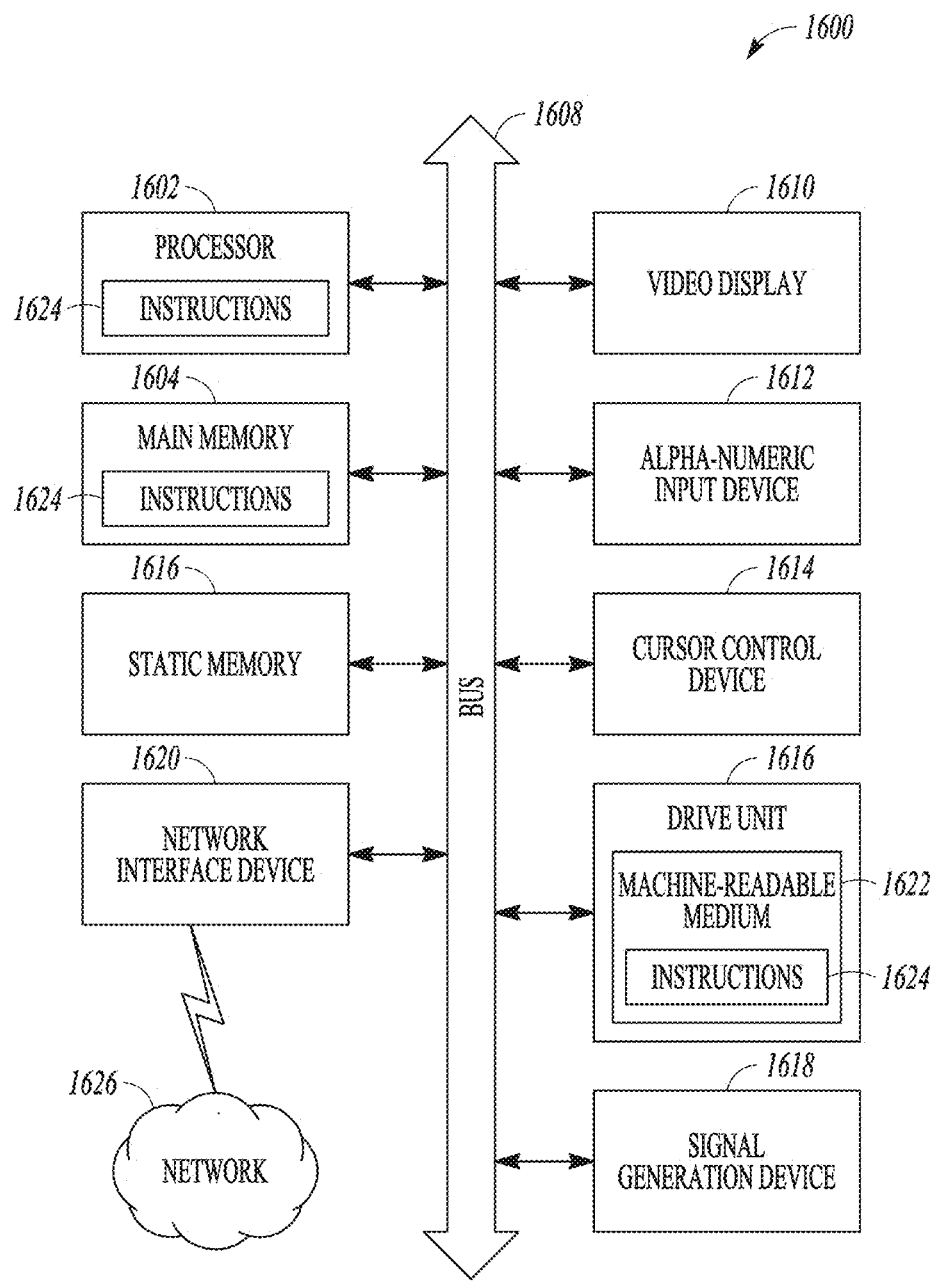
FIG. 16 is a block diagram illustrating components of a machine that is able to read instructions from a machine-readable medium (e.g., a machine-readable storage medium) and perform any one or more of the methodologies discussed herein.

FIG. 16 is a block diagram of a machine in the example form of a computer system 1600 within which instructions 1624 for causing the machine to perform any one or more of the methodologies discussed herein can be executed, in accordance with some example embodiments. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 can further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation (or cursor control) device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of data structures and instructions 1624 (e.g., software) embodying or utilized by any one or more of the methodologies or functions described herein. The instructions 1624 can also reside, completely or at least partially, within the main memory 1604 and/or within the processor 1602 during execution thereof by the computer system 1600, the main memory 1604 and the processor 1602 also constituting machine-readable media. The instructions 1624 can also reside, completely or at least partially, within the static memory 1606.

While the machine-readable medium 1622 is shown in an example embodiment to be a single medium, the term "machine-readable medium" can include a single medium or multiple media (e.g., a centralized or distributed database, and/or associated caches and servers) that store the one or more instructions 1624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1624 can further be transmitted or received over a communications network 1626 using a transmission medium. The instructions 1624 can be transmitted using the network interface device 1620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system comprising:
a computer processor configured to:
receive an input string from a user;
search for the input string in a plurality of program code files in an integrated software development environment (IDE);
display a result on a viewport of a display unit, the result comprising miniature views of the program code files, wherein the result on the viewport of the display unit comprises equally-sized tiles, or the result on the viewport of the display unit comprises a set of blocks with a varying compression rate applied to the blocks, such that the blocks permit a fitting of a large amount of program code files on the viewport of the display unit;
display the set of blocks by placing an initial block at the center of the viewport of the display unit;
place a subsequent block to the left, right, below, or above the initial block, such that the subsequent block is placed a least distance from the center of the viewport of the display unit;
iteratively place a plurality of subsequent blocks such that each subsequent block is placed at the least distance from the center of the viewport of the display unit and such that each subsequent block does not overlap any other previously placed block;
apply an increasing compression rate to the set of blocks as the distance from the center of the viewport of the display unit increases; and
move the display of the blocks about the center of the viewport of the display unit, thereby increasing a size of a particular block as the particular block moves toward the center of the viewport of the display unit; wherein the least distance is determined from the center of the subsequent block.

2. The system of claim 1, wherein the display of the equally-sized tiles includes a scrollbar; and wherein the display of the blocks does not include a scrollbar.

3. The system of claim 1, wherein the computer processor is configured to define a search scope comprising one or more of program code files with a particular extension, program code files categorized in a certain project, program code files currently open in a workspace, program code files currently closed in the workspace, and all program code files in an entire workspace.

4. The system of claim 1, wherein the miniature views of the program code files are generated by traversing the program code files line by line.

5. The system of claim 1, wherein the computer processor is configured to calculate a number of columns and a compression factor for the equally-sized tiles based on a number of lines in the program code files; and
wherein the computer processor is configured to calculate the number of columns and the compression rate independently for each of the program code files, such that each program code file comprises an independent number of columns for the equally-sized tiles associated with each independent program code file.

6. The system of claim 1, wherein the increasing compression rate is applied both vertically and horizontally to the set of blocks.

7. The system of claim 1, wherein the computer processor is configured to receive a selection of a single block from a user; and
in response to the user selection, move the selected single block to the center of the viewport of the display unit.

8. The system of claim 1, wherein the computer processor is configured to zoom-in and zoom-out the display of the blocks with a non-affine transformation to the viewport of the display unit.

9. The system of claim 1, wherein the computer processor is configured to receive input from a user selecting a particular equally-sized tile or a particular block; and
to display an enlarged view of the particular equally-sized tile or the particular block in a second viewport of the display unit, thereby generating a code preview of the particular equally-sized tile or the particular block.

10. The system of claim 1, wherein the computer processor is configured to order the search of the programs code files as a function of one or more of currently opened program code files and when the currently opened program files were opened, program code files that have been changed or saved, a total amount of time that each particular program code file has been opened over a defined time period, and a number of lines in each particular program code file.

11. A non-transitory computer readable medium comprising instructions that when executed by a processor execute a process comprising:
receiving an input string from a user;
searching for the input string in a plurality of program code files in an integrated software development environment (IDE);
displaying a result on a viewport of a display unit, the result comprising miniature views of the program code files, wherein the result on the viewport of the display unit comprises equally-sized tiles, or the result on the viewport of the display unit comprises a set of blocks with a varying compression rate applied to the blocks, such that the blocks permit a fitting of a large amount of program code files on the viewport of the display unit;

displaying the set of blocks by placing an initial block at the center of the viewport of the display unit;

placing a subsequent block to the left, right, below, or above the initial block, wherein the subsequent block is placed a least distance from the center of the viewport of the display unit;

iteratively placing a plurality of subsequent blocks such that each subsequent block is placed at the least distance from the center of the viewport of the display unit and such that each subsequent block does not overlap any other previously placed block;

applying an increasing compression rate to the set of blocks as the distance from the center of the viewport of the display unit increases; and moving the display of the blocks about the center of the viewport of the display unit, thereby increasing a size of a particular block as the particular block moves toward the center of the viewport of the display unit; wherein the least distance is determined from the center of the subsequent block.

12. The non-transitory computer readable medium of claim 11, comprising instructions for zooming-in and zooming-out the display of the blocks with a non-affine transformation to the viewport of the display unit.

13. A method comprising:

receiving an input string from a user;

searching for the input string in a plurality of program code files;

displaying a result on a viewport of a display unit, the result comprising miniature views of the program code files, wherein the result on the viewport of the display unit comprises equally-sized tiles, or the result on the viewport of the display unit comprises a set of blocks with a varying compression rate applied to the blocks, such that the blocks permit a fitting of a large amount of program code files on the viewport of the display unit;

displaying the set of blocks by placing an initial block at the center of the viewport of the display unit; and placing a subsequent block to the left, right, below, or above the initial block, wherein the subsequent block is placed a least distance from the center of the viewport of the display unit;

iteratively placing a plurality of subsequent blocks such that each subsequent block is placed at the least distance from the center of the viewport of the display unit and such that each subsequent block does not overlap any other previously placed block;

applying an increasing compression rate to the set of blocks as the distance from the center of the viewport of the display unit increases; and moving the display of the blocks about the center of the viewport of the display unit, thereby increasing a size of a particular block as the particular block moves toward the center of the viewport of the display unit; wherein the least distance is determined from the center of the subsequent block.

14. The method of claim 13, comprising receiving a selection of a single block from a user; and in response to the user selection, move the selected single block to the center of the viewport of the display unit.

15. The method of claim 13, comprising ordering the search of the programs code files as a function of one or more of currently opened program code files and when the currently opened program files were opened, program code files that have been changed or saved, a total amount of time that each particular program code file has been opened over a defined time period, and a number of lines in each particular program code file.

* * * * *